Jan. 25, 1949.  A. H. MYLES ET AL  2,460,234
INDUCTION MOTOR CONTROL SYSTEM
Filed June 18, 1943
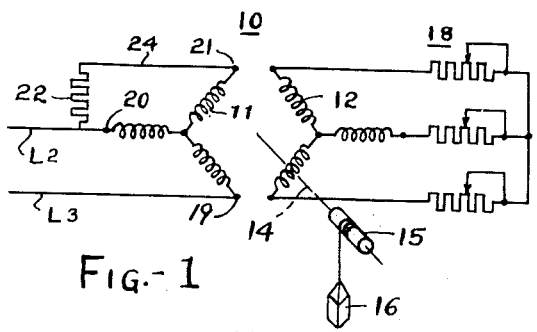
Fig.-1
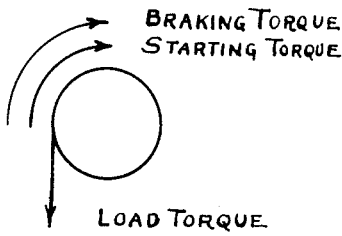
Fig.-4
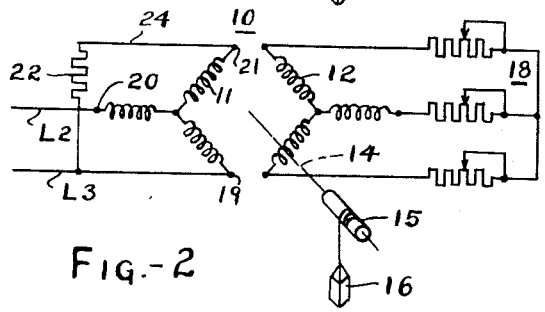
Fig.-2
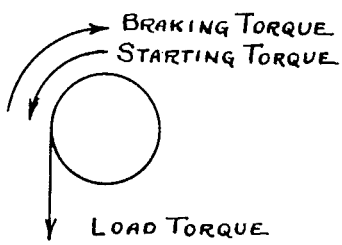
Fig.-5
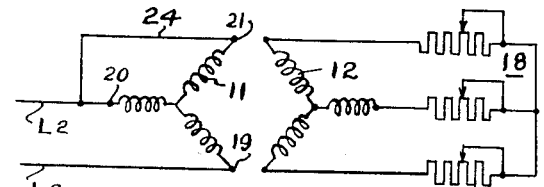
Fig.-3 (PRIOR ART)
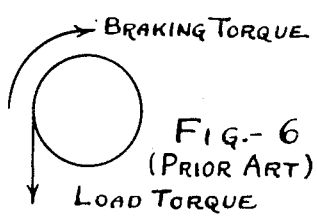
Fig.-6 (PRIOR ART)
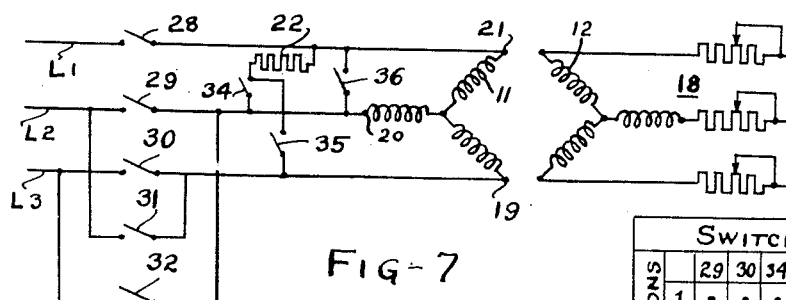
Fig.-7
Fig.-8
INVENTORS
ASA H. MYLES &
ALFRED C. PROTTENGEIER
BY
their ATTORNEYS Patented Jan. 25, 1949

2,460,234

UNITED STATES PATENT OFFICE 2,460,234

INDUCTION MOTOR CONTROL SYSTEM

Asa H. Myles and Alfred C. Prottengeier, Solon, Ohio, assignors to The Electric Controller & Manufacturing Company, Cleveland, Ohio, a corporation of Ohio Application June 18, 1943, Serial No. 491,310

14 Claims. (Cl. 318—211)

1

This invention relates to alternating current motor control systems, and more particularly to electrical braking circuits for small motors of the polyphase wound rotor induction type. Although the invention has many applications, its greatest usefulness is in controlling such motors when they are arranged to be driven at times by an overhauling load, and is described and claimed herein as applied to a motor drivingly connected to a load of that type.

It is known that if a portion or all of the primary winding of a polyphase induction motor having sufficient resistance in its secondary circuit is excited from a source of power having preponderantly single phase characteristics while a portion of the primary winding is connected in a local circuit of negligible resistance, a braking torque is produced by the motor at all speeds above standstill in either direction of rotation. This general type of motor connection is hereinafter referred to as an alternating current dynamic braking connection. If the source of power has no quadrature voltage component, i. e. a component capable of producing a quadrature field, a motor connected as just described produces no effective starting torque regardless of the relative space distribution of the excited portion of the primary winding and the portion of the primary winding connected in the local circuit.

Considering, for example, a three-phase motor having its primary winding connected for alternating current dynamic braking by having two of its non-neutral terminals connected to a source of single phase power and the third non-neutral terminal connected in a local circuit to one of the other terminals. If the source of power has no quadrature voltage component, such connection creates, at standstill, a phenomenon which may be considered to be two oppositely rotating magnetic fields of equal magnitude in the air gap of the motor. Since these fields are of equal magnitude and are rotating oppositely, the net effective motor torque produced at standstill is zero. Due to the fact that a portion of the primary winding is connected in a closed circuit of low impedance the strength of these fields does not vary with the speed, but the torque resulting from the field rotating oppositely with respect to the motor increases and the torque resulting from the other field decreases as the motor speed increases. Therefore, the relative magnitude of the two opposite torques produced by the magnetic fields is such that a net retarding torque tending to stop the motor exists at all speeds regardless of the direction of motor rotation. The single-phase alternating current dynamic braking connection just described has been used extensively. However, it is desirable that some starting torque be produced even though the motor is connected for alternating current dynamic braking.

In accordance with this invention a resistance element is connected in series in the local closed circuit between two terminals of the primary winding of a polyphase motor connected for alternating current dynamic braking. This resistance in conjunction with the reactance of the windings of crane motors in the smaller horsepower ranges acts as a phase-splitter and produces an out of phase voltage component which may be said to change the relative magnitude of the two oppositely rotating fields so that they are no longer of equal magnitude, and an effective starting torque is thereby produced. The direction of the starting torque depends upon the selection of the terminals between which the local closed circuit is completed. Since sufficient resistance is included in the secondary circuit, and a portion of the primary winding is connected in a local closed circuit, the torque resulting from the field rotating oppositely with respect to the motor increases and that from the other field decreases as the motor speed increases as before. Assuming that the starting torque assists an overhauling load at standstill and that the overhauling load is normally capable of driving the motor at high speed, the torque produced by the smaller rotating field increases with the speed and eventually overcomes the torque produced by the larger rotating field, the latter torque having decreased as the speed increased. A stable speed is then reached when the difference in the two motor torques is equal and opposite to the torque of the load. If the resistor in the local closed circuit is connected so as to create a starting torque in a direction opposed to that of the load, an effective retarding or counter-torque exists at standstill and the torque of the load is overcome at a slower motor speed.

An object of this invention is to provide a new and improved motor control system.

Another object is to provide an improved induction motor and control system combination.

A further object is to provide a motor control system for a polyphase induction motor by means of which, without change of motor connections, the direction of effective motor torque is caused to be opposite at slow speeds and at standstill from its direction at higher speeds under synchronism as well as above synchronous speed.

Another object is to provide a control system for a polyphase induction motor arranged to be drivingly connected to an overhauling load by means of which the motor, while excited from a source of power having preponderantly single phase characteristics, opposes the torque of the load at all speeds including standstill.

Another object is to provide induction motor connections whereby the motor, without change of connections, produces an effective starting torque at standstill and an alternating current dynamic braking torque when operating at higher speeds both below and above synchronism.

Other objects and advantages of this invention will become apparent from the following description wherein reference is made to the drawings, in which Figs. 1 and 2 are wiring diagrams illustrating motor connections in accordance with this invention;

Fig. 3 is a wiring diagram illustrating a prior art braking connection;

Figs. 4, 5 and 6 are diagrams illustrating the relative direction of braking, starting and load torques for Figs. 1, 2 and 3, respectively;

Fig. 7 is a wiring diagram illustrating the connections of Figs. 1, 2 and 3 combined in a single control system, and Fig. 8 is a switch sequence chart for Fig. 7.

As illustrated in the drawings, the invention is applied to the control of a three-phase, wound rotor induction motor 10 having a primary winding 11 and a secondary winding 12. The secondary winding 12 is considered as the rotating winding, although the primary winding 11 may be the rotating winding if desired, and the rotating winding is drivingly connected as by a shaft 14 to a drum 15 from which is suspended an overhauling load 16. The secondary circuit includes an adjustable Y-connected resistance network 18 connected in the usual manner to the non-neutral terminals of the secondary winding 12. For the braking operations to be described, the secondary circuit preferably has its resistance so adjusted that the ohmic value of the resistance of the secondary circuit is equal to the ohmic value of the reactance of the secondary circuit measured at twice the frequency of the voltage applied to the primary winding 11. The primary winding 11 has three non-neutral terminals 19, 20 and 21, and is arranged to be excited through conductors $L_1$, $L_2$ and $L_3$, Fig. 7, leading from a source of polyphase power (not shown).

Referring now specifically to Fig. 1, the primary terminals 19 and 20 are connected to the conductors $L_3$ and $L_2$, respectively. Starting torque for the motor 10 in a direction opposed to the torque of the overhauling load 16 is provided by a resistor 22 interposed in a conductor 24 extending from the terminal 21 to the conductor $L_2$. The starting torque is generally insufficient to prevent, by itself, lowering of the load 16, since the ohmic value of the resistor 22 is such that the local closed circuit including the conductor 24 and the resistor 22 has a sufficiently low impedance so as not to impair the retarding torque of the motor created upon rotation by the overhauling load 16. Although the single phase power obtained from the conductors $L_2$ and $L_3$ is assumed to have no quadrature voltage component, the primary winding 11 is energized by electrical power having preponderantly single phase characteristics but, due to the resistor 22, including a quadrature voltage component applied to an angularly disposed portion of the primary winding. Since the secondary circuit has a high resistance and a local closed circuit of low impedance exists in the primary circuit, an effective braking torque opposed to the torque of the overhauling load 16 is created by the motor 10 as soon as it is rotated above a predetermined speed below synchronism by the torque of the load 16. The braking torque increases with the speed in the manner hereinbefore described, and a stable lowering speed for the load 16 is eventually reached. The relative directions of the torques involved in Fig. 1 are diagrammatically illustrated in Fig. 4.

In Fig. 2 the primary terminal 21 of the motor 10 is connected through the resistor 22 and the conductor 24 to the conductor $L_3$ instead of to the conductor $L_2$ as in Fig. 1, and, consequently the larger of the two rotating fields now produces an effective starting torque which is in the same direction as the torque of the overhauling load 16. Said starting torque drives the drum in the lowering direction at a slow speed even if the load 16 is not present. However, at a predetermined low speed and with the load 16 attached, the torque produced by the rotating field which tends to oppose the torque of the load 16 becomes greater and exceeds the torque produced by the other rotating field so that an effective braking action occurs to limit the lowering speed of the load 16. This relationship of torques is illustrated in Fig. 5. The starting torque is preferably very small since it is necessary that it have only sufficient magnitude to overcome friction when no load is connected on the drum 15. Such low value of starting torque can be produced by using a resistor 22 of sufficiently low ohmic value that the braking torque created at higher speeds is adequate to enable the controlled lowering of heavy loads.

For comparative purposes a prior art connection is shown in Fig. 3 wherein the terminal 21 is connected directly to the conductor 12 through the conductor 24, the resistor 22 being omitted. With the connections of Fig. 3, no effective starting torque is produced, since the two oppositely rotating fields are equal at standstill; but, if the motor accelerates, due to the overhauling load, the retarding torque of the motor 10 increases gradually from zero at standstill to high values at over-synchronous speeds. The torque relationships produced by the connections according to Fig. 3 are shown in Fig. 6.

In Fig. 7 is illustrated the power circuits of a controller for the motor 10 embodying the connections of Figs. 1, 2 and 3. Any suitable means may be provided for adjusting the resistance of the secondary resistance network 18. Switches 28, 29 and 30 are arranged to connect the motor 10 to the polyphase power supply conductors $L_1$, $L_2$ and $L_3$ for lowering operations; and switches 31 and 32, together with the switch 28, are arranged to connect the motor 10 to the conductors $L_1$, $L_2$ and $L_3$ for hoisting operations. A switch 34 is arranged to connect the terminal 21 to the conductor $L_2$ through the resistor 22 and the switch 29; and a switch 35 is arranged to connect the terminal 21 to the conductor $L_3$ through the resistor 22 and the switch 30. A switch 36 is arranged to connect the terminal 21 to the conductor $L_2$ in a circuit of negligible resistance. The switches shown in Fig. 7 may be operated in any suitable manner, but preferably are operated electromagnetically and controlled from a suitable master switch having several operating positions. The switches to be closed in each of the several master switch positions are indicated in Fig. 8, a dot representing a closed condition of the respective switch in the respective position. Hoisting connections may be of the usual sequence and are not indicated in Fig. 8.

In the first position of the master switch, the switches 29, 30 and 34 are closed and the connections of Fig. 1 are produced. A small effective hoisting torque exists at standstill and the overhauling load 16 is retarded at all speeds. In the second position of the master switch, only the switches 29, 30 and 36 are closed and the prior art connections of Fig. 3 are produced. No retarding or assisting torque is produced at standstill with the master switch in the second position, but retarding torque is produced at all speeds above standstill. In the third position, only the switches 29, 30 and 35 are closed; the connections of Fig. 2 are set up, and an effective motor torque assisting the torque of the load 16 exists at standstill and at slow speeds. When the motor is driven at higher speeds by the overhauling load 16, the torque produced by one of the two rotating fields overcomes the torque of the load as well as the torque of the other field and the load 16 lowers at a stable speed. In the fourth position the switches 28, 29 and 30 are closed and polyphase motor action assists the torque of the overhauling load 16 at all speeds under synchronism, the ultimate speed being above synchronous speed to a degree determined by the size of the load 16 and the resistance of the network 18.

We claim:

1. A control system for a three-phase induction motor arranged to be driven at times by an overhauling load and having a secondary winding and a primary winding which is provided with only three accessible terminals all of which are non-neutral, comprising a secondary circuit network of relatively high resistance, means for connecting said network to said secondary winding, means for connecting said primary winding to a source of power to produce within said motor the phenomenon considered as oppositely rotating magnetic fields, said secondary circuit network having an ohmic resistance approximately equal to the ohmic reactance of said secondary winding measured at twice the frequency of said source, means for electrically interconnecting two of said terminals to define a local closed circuit to cause said motor to produce a braking torque when driven by said overhauling load, and means interposed in said local closed circuit to cause said oppositely rotating fields to be sufficiently unequal in magnitude to produce a starting torque in said motor.

2. In a motor and control system combination, a three-phase induction motor arranged to be driven at times by an overhauling load and having a primary winding provided with only three accesssible terminals all of which are non-neutral and a secondary winding which is connected in a closed circuit of relatively high resistance, means for exciting said primary winding with alternating current to produce within said motor the phenomenon considered as oppositely rotating magnetic fields, the ohmic resistance of said closed circuit being approximately equal to the ohmic reactance of said secondary winding measured at twice the frequency of said alternating current, a local circuit interconnecting two of said terminals for maintaining the magnitude of said fields approximately constant regardless of the motor speed, whereby a braking torque is produced by said motor when driven by said overhauling load, and means electrically associated with said local circuit for causing said fields to produce a starting torque in said motor.

3. In a motor and control system combination, a three-phase induction motor arranged to be driven at times by an overhauling load and having a primary winding provided with only three accessible terminals all of which are non-neutral and a secondary winding which is connected in a closed circuit of relatively high resistance, means for connecting two of said terminals to a source of single phase power to produce the phenomenon considered as oppositely rotating magnetic fields in said motor, the ohmic resistance of said closed circuit being approximately equal to the ohmic reactance of said secondary winding measured at twice the frequency of said source, connecting means for electrically associating the other of said terminals with one of said two terminals to cause said motor to exert a braking torque when driven by said overhauling load, and means electrically associated with said connecting means for causing said motor to exert a starting torque when said two terminals are connected to said source.

4. A control system for a three-phase induction motor arranged to be driven at times by an overhauling load and having a secondary winding and a primary winding, said primary winding being provided with only three accessible terminals all of which are non-neutral, comprising means for connecting said secondary winding in a closed circuit of relatively high resistance, means for connecting two of said primary terminals to two output terminals, respectively, of a source of three phase power, whereby there would ordinarily be produced in said motor the phenomenon considered as oppositely rotating magnetic fields which would be equal in magnitude when the motor is at rest but which would vary in magnitude during rotation of the motor, the ohmic resistance of said closed circuit being approximately equal to the ohmic reactance of said secondary winding measured at twice the frequency of said source, connecting means for electrically interconnecting the other primary terminal and one of said two primary terminals to cause said two oppositely rotating fields to remain substantially constant independently of the speed of said motor, whereby said motor produces a braking torque at sub-synchronous speeds when driven by said overhauling load, and means electrically associated with said connecting means for causing said oppositely rotating fields to be sufficiently unequal in magnitude when said motor is at rest to produce a starting torque, the relative magnitude of said two fields remaining approximately constant as said motor accelerates due to said starting torque and when driven by said overhauling load.

5. In a motor and control system combination, a three-phase induction motor having a primary winding provided with only three accessible terminals all of which are non-neutral and a secondary winding which is connected in a closed circuit of relatively high resistance, means for connecting two of said terminals to a source of single phase power, whereby there would ordinarily be produced in said motor the phenomenon considered as two oppositely rotating magnetic fields which would be equal in magnitude when the motor is at rest but which would vary in magnitude during rotation of the motor, the ohmic resistance of said closed circuit being approximately equal to the ohmic reactance of said secondary winding measured at twice the frequency of said source, connecting means defining an electrical connection between the other of said terminals and one of said two terminals to cause said two oppositely rotating fields to remain substantially constant independently of the speed of said motor, an electrical impedance means interposed in said electrical connection and so related to the electrical constants of said motor as to cause said oppositely rotating fields to be unequal at standstill to produce thereby a relatively low starting torque, and means for subjecting said motor to an overhauling load for driving said motor at a speed such that said fields produce a net torque in said motor opposing the torque of said overhauling load.

6. In a motor and control system combination, a source of three-phase power having three non-neutral output terminals, a three-phase induction motor having a secondary winding and a primary winding provided with only three accessible terminals all of which primary terminals are non-neutral, means connecting two of said primary terminals to two terminals, respectively, of said source, and electrically associating the other of said primary terminals with one of said two primary terminals to produce an elliptical magnetic field in said motor the magnitude of which is independent of motor speed, an electrical network having an ohmic resistance approximately equal to the ohmic reactance of said secondary winding measured at twice the frequency of said source, means connecting said secondary winding to said electrical network, whereby said motor if unloaded accelerates to a stable speed under synchronism, and means for driving said motor at a speed above the no-load speed produced by said elliptical field.

7. In a motor and control system combination, a source of three-phase power having three non-neutral output terminals, a three-phase induction motor having a secondary winding and a primary winding provided with only three accessible terminals all of which are non-neutral, means connecting two of said primary terminals to two terminals, respectively, of said source, an electrical connection between the other of said primary terminals and one of said two primary terminals thereby in effect to impress two balanced polyphase voltages of opposite phase sequence on said primary winding the magnitude of each of which is independent of motor speed, an electrical network having an ohmic resistance approximately equal to the ohmic reactance of said secondary winding measured at twice the frequency of said source, means connecting said secondary winding to said electrical network, starting means electrically associated with said electrical connection for causing one of said two voltages to be slightly greater than the other, whereby said motor at slow speeds exerts a net motor torque, and means for driving said motor at a speed in excess of the maximum slow speed resulting from the motor torque produced by said primary connections.

8. A control system for a polyphase induction motor arranged to be driven at times by an overhauling load and having a primary winding and a secondary winding which is connected in a closed circuit of relatively high resistance, means for exciting said primary winding from a source of single phase power, the ohmic resistance of said closed circuit being approximately equal to the ohmic reactance of said secondary winding measured at twice the frequency of said source, means electrically associated with said primary winding for causing said motor to produce a starting torque when excited with single phase power, said means including an electrical impedance element connected between two terminals of said primary winding of low enough value to permit said motor to exert a retarding torque when driven at speeds both above and below synchronism by said overhauling load.

9. A control system for a three-phase induction motor arranged to be driven at times by an overhauling load and having a primary winding provided with only three accessible terminals all of which are non-neutral and a secondary winding, means for connecting said secondary winding in a closed circuit of relatively high resistance, means for connecting two of said primary terminals to a source of single phase power, means for completing an electrical connection between the other of said primary terminals and one of said two primary terminals, and a resistance element interposed in said electrical connection and having an ohmic value relative to the resistance and reactance of said primary winding such that said motor exerts a starting torque at standstill and a motor torque at slow speeds under synchronism while said secondary winding is connected in said closed circuit and said two primary terminals are connected to said source, the value of said resistance element also being such that, when said motor is driven by said overhauling load at speeds in excess of said slow speeds, said motor exerts a torque in a direction opposite to said starting and slow speed torque.

10. In a motor and control system combination, a polyphase induction motor having a primary winding provided with terminals and a secondary winding which is connected in a closed circuit of relatively high resistance, an overhauling load drivingly connected to said motor, means for connecting two of said terminals to a source of single phase power, an electrical connection between another of said terminals and one of said two terminals, and a resistance element interposed in said electrical connection and having an ohmic value relative to the resistance and reactance of said primary winding such that said motor exerts a starting torque at standstill and a motor torque at slow speeds under synchronism while said two terminals are connected to said source, the ohmic value of said resistance also being such that when said motor is driven by said load at speeds in excess of said slow speeds, said motor exerts a torque in a direction opposite to said starting and slow speed torque.

11. In a motor and control system combination, a three-phase induction motor having a primary winding provided with only three accessible terminals all of which are non-neutral and a secondary winding which is connected in a closed circuit of relatively high resistance, an overhauling load drivingly connected to said motor, means for connecting two of said terminals to a source of single phase power, an electrical connection between the other of said terminals and one of said two terminals, and a resistance element interposed in said electrical connection and having an ohmic value relative to the resistance and reactance of said primary winding such that said motor exerts a starting torque at standstill and a motor torque at slow speeds under synchronism while said two terminals are connected to said source, the ohmic value of said resistance element also being such that, when said motor is driven by said load at speeds in excess of said slow speeds, said motor exerts a torque in a direction opposite to said starting and slow speed torque.

12. In connection with a three-phase induction motor having a secondary winding and a primary winding which is provided with but three accessible terminals all of which are non-neutral, the method of controlling the speed of said motor while driving a load and while said motor is being driven by an overhauling load, which includes connecting said secondary winding in a closed circuit the resistance of which including the resistance of said secondary winding is approximately equal to the ohmic reactance of said secondary winding measured at twice the rated frequency of said motor, while said secondary circuit is so connected impressing on said primary terminals unbalanced polyphase voltages of rated frequency which have an unbalance factor sufficiently less than one hundred percent to produce in said motor the phenomenon considered as two oppositely rotating magnetic fields the magnitudes of which are so related as to cause the motor to exert a net starting torque, and maintaining said unbalance factor approximately constant during operation of said motor.

13. In connection with a three-phase induction motor having a secondary winding and a primary winding which is provided with but three accessible terminals all of which are non-neutral, the method of controlling the speed of the motor while driving a load and while the motor is being driven by an overhauling load, which includes connecting said secondary circuit in a closed circuit of relatively low resistance, while said secondary winding is so connected impressing balanced three-phase voltages of rated frequency across said primary terminals, whereby said motor drives loads at speeds slightly under synchronism and is driven by overhauling loads at speeds slightly over synchronism, and, to cause said motor to operate at speeds considerably less than synchronism while driving a load and while being driven by an overhauling load, connecting said secondary circuit in a closed circuit the resistance of which including the resistance of said secondary winding is approximately equal to the ohmic reactance of said secondary winding measured at twice the rated frequency of said motor, while said secondary circuit is connected as last described impressing on said primary terminals unbalanced polyphase voltages of rated frequency and derived solely from a single-phase source and, said voltages having an unbalance factor sufficiently less than one hundred percent to produce in said motor the phenomenon considered as two oppositely rotating magnetic fields the magnitudes of which are so related as to cause the motor to exert a net starting torque, and maintaining said unbalance factor approximately constant during operation of said motor.

14. A control system in accordance with claim 9 characterized in that said closed circuit has an ohmic resistance approximately equal to the ohmic reactance of said secondary winding measured at twice the frequency of said source.

ASA H. MYLES.
ALFRED C. PROTTENGEIER.

REFERENCES CITED

The following references are of record in the file of this patent:

UNITED STATES PATENTS

| Number | Name | Date |
| --- | --- | --- |
| 620,988 | Steinmentz et al. | Mar. 14, 1899 |
| 1,895,946 | Stein | Aug. 2, 1928 |

FOREIGN PATENTS

| Number | Country | Date |
| --- | --- | --- |
| 109,348 | Austria | Apr. 10, 1928 |
| 299,886 | Great Britain | Oct. 31, 1929 |
| 487,695 | Great Britain | June 24, 1938 |
| 259,710 | Italy | Aug. 2, 1928 |